UNITED STATES PATENT OFFICE.

M. H. NICOLAS AND L. J. CHAMPAGNE, OF THIBODEAUX, LOUISIANA.

IMPROVEMENT IN DEFECATING SUGAR-JUICES.

Specification forming part of Letters Patent No. 24,572, dated June 28, 1859.

*To all whom it may concern:*

Be it known that we, MARIE H. NICOLAS and LOUISE CHAMPAGNE, of Thibodeaux, in the parish of La Fourche and State of Louisiana, have made a new and useful Discovery for Clarifying Sugar-Juices; and we do hereby declare that the following is a full, clear, and exact description of the same.

The nature of our invention consists in the employment, in the bleaching and defecating of sugar-juices, of the herein-described combination of sulphur and lime, prepared in the manner substantially as herein set forth.

To make a certain quantity of the compound in a liquid state and employ the same successfully, we proceed as follows:

First. We employ, say, one pound of roll-sulphur finely pulverized, or of flowers of sulphur so well washed as not to redden the litmus-paper, and five pounds of the best quicklime.

Second. We slake the lime, and, while hot and beginning to be efflorescent, mix it with the sulphur and stir well dry; or we take five pounds of fresh-slaked lime, sifted fine, and mix with the sulphur, as above.

Third. We put the two powders thus well mixed or triturated in a kettle or pot, and pour in four gallons of rain or sweet river water, and allow the whole to boil about half an hour while being agitated or stirred with a wooden spatula. We then allow the liquor to rest and cool, and when cold enough and the sediment well settled draw off carefully the limpid liquor with a siphon, or in a suitable manner.

Fourth. Upon the residuum we pour, say, four more gallons of rain or other suitable water, and boil again for half an hour, stirring, cooling, and drawing off as above the limpid liquor. If there still remains any sulphur, pour in a little more rain or other suitable water in the kettle or pot, boil, cool, and drain off as above.

Fifth. We mix together in a tight vessel the two or three liquors drawn off as above, and cork it well for use.

The sulphur and the lime, we find, combine perfectly well together in several chemical proportions, whether mixed dry in a crucible, or by sprinkling the lime and sulphur with water, or by boiling the lime and sulphur in water, as above described. We have found such compounds serviceable, and do not therefore confine ourselves to the use of any special sulphide, but prefer to use the compound made in the manner specified.

When the compound is used dry, the sugar-juice in the "grand" kettle accomplishes substantially the same office as the water in separate mixing-pots, and therefore the liquid and the dry compound are alike in effect. The latter, however, occupies less room, and were it not that negroes attend the sugar apparatus, and are not so capable of weighing in scales nice quantities as they are of measuring large quantities in a vessel, it would be preferable.

The process and the proportions set forth appear to be satisfactory enough; but we do not, as stated, limit ourselves to any particular proportions, as the same may be modified and yet not change the result materially.

As it is found that the exposure of the compound to atmospheric influences causes it to lose its defecating and bleaching properties by absorbing in a short time the oxygen, it is well to employ it as fresh as possible and prepare but a small quantity of it at a time for use.

The manner of using this compound, which may be called "sulphide of calcium," chemically speaking, but which we shall hereinafter call "Nicolas' Liquor or Powder," is, first, to put it by eighths or quarters of a gallon in the juice-box until it changes the natural color of the juice into a light gray, dim, milky appearance. Then the juice will redden the litmus-paper deeper than the juice alone; second, put, by cubic inches of fresh-slaked lime, in the juice so prepared, as much of it as will cause the disappearance of the red cast or color of the litmus-paper, or sensibly diminish its red tint. If there be from six to ten juice-boxes, you can continue to lime the juice in them, as the trouble of the washing of the boxes clean will be thereby greatly diminished; but if there be only four juice-boxes it is better to lime the prepared juice when it is found in the grand. Then and in that case, (if the grand is quick to boil,) from five to fifteen minutes after the juice has been put in it the universally-known marks, found by Joseph Nicolas, must appear, as explained below, to wit: First, as soon as the juice is limed in the grand, skim off lightly; then if, from five to twenty minutes after the skimming has been made, the traces or marks of the skimmer vanish, the color of the scum forming or accumulating on the top of the juice assume a pale-yellow or whitish-gray color on all the surface of the juice, the liming is too weak; second, if, on the contrary, after the same time has expired, the traces of the skimmer remain visible on the surface of the juice, varying in color, such as gray, yellowish, or dark gray, or other sensible colors, except dark green, and that in those skimmer traces very fine dark streaks appear, as though they were made with a sharp-pointed pencil (crosswise) or upon a certain angle with those skimmer traces, and if those streaks do not widen much until the boiling-point of the juice, and, again, if in those streaks burst out very white round spots of froth or foam, here called "white mushrooms," it is a proof of a good defecation; third, but when on the first appearance those streaks are large and widen much until the boiling-point, they disclose a too high liming. However, in frosted or in very green cane the streaks must be generally pretty large.

We do not claim the use of the sulphite or the bisulphite of lime, nor of sulphurous acid alone; but What we do claim as our invention, and desire to secure by Letters Patent, is—

The employment, in the bleaching and defecating of sugar-juices, of the herein-described combination of sulphur and lime, prepared in the manner substantially as set forth.

M. HÉLOISE NICOLAS,

Duly authorized, aided, and assisted by me, her husband,

JOSH. NICHOLAS.

LOUISE CHAMPAGNE,

Duly authorized, aided, and assisted by me, her husband,

G. CHAMPAGNE.

Witnesses:
L. DAUNIS,
A. ROMAN.